(12) United States Patent
Pouillon

(10) Patent No.: US 11,368,189 B2
(45) Date of Patent: Jun. 21, 2022

(54) ELECTRONIC APPARATUS COMPRISING TWO MEMORIES AND ASSOCIATED APPARATING METHOD

(71) Applicant: FREEBOX, Paris (FR)

(72) Inventor: Nicolas Pouillon, Colombes (FR)

(*) Notice: Subject to any disclaimer, the term of this patent is extended or adjusted under 35 U.S.C. 154(b) by 445 days.

(21) Appl. No.: 15/992,392

(22) Filed: May 30, 2018

(65) Prior Publication Data

US 2018/0352429 A1 Dec. 6, 2018

(30) Foreign Application Priority Data

May 30, 2017 (FR) ...................... 17 54725

(51) Int. Cl.
| | |
|---|---|
| *H04B 3/54* | (2006.01) |
| *H04L 9/08* | (2006.01) |
| *H04W 12/041* | (2021.01) |
| *H04W 12/06* | (2021.01) |
| *G06F 21/60* | (2013.01) |

(52) U.S. Cl.
CPC ............. *H04B 3/54* (2013.01); *H04L 9/0827* (2013.01); *H04L 9/0894* (2013.01); *H04W 12/041* (2021.01); *H04W 12/06* (2013.01); *G06F 21/606* (2013.01); *H04L 9/0844* (2013.01)

(58) Field of Classification Search
CPC ... H04L 9/0827; H04L 9/0894; H04L 9/0844; G06F 21/606; H04W 12/0401; H04W 12/06
See application file for complete search history.

(56) References Cited

U.S. PATENT DOCUMENTS

| | | | |
|---|---|---|---|
| 7,162,634 B2 | 1/2007 | Litwin, Jr. et al. | |
| 7,877,646 B2* | 1/2011 | Baranowsky | ....... G06F 11/3476 714/47.1 |
| 8,816,831 B2 | 8/2014 | Yakar et al. | |
| 9,565,187 B2* | 2/2017 | Daley | .................. G06F 21/445 |
| 9,801,219 B2* | 10/2017 | Sonnino | ................ H04W 12/04 |
| 9,924,355 B2* | 3/2018 | Naruse | ................ H04L 63/0442 |
| 10,475,325 B2* | 11/2019 | Schueler | ........... H04W 52/0216 |
| 2017/0244562 A1* | 8/2017 | He | ........................... H04L 9/30 |

OTHER PUBLICATIONS

Gabay, Jon, "Power Line Communications: A Viable Consumer Link", May 29, 2013, pp. 1-11, https://www.digikey.com/en/articles/power-line-communications-a-viable-consumer-link (Year: 2013).*

(Continued)

*Primary Examiner* — Beemnet W Dada
(74) *Attorney, Agent, or Firm* — B. Aaron Schulman, Esq.; Stites & Harbison, PLLC

(57) ABSTRACT

The invention relates to an electronic device (10A, 10B) intended to interact with at least one other electronic device (10A, 10B), the electronic device (10A, 10B) including a processor (12A, 12B), a first memory (16A, 16B) and a second memory (18A, 18B) separate from the first memory (16A, 16B), the first memory (16A, 16B) being a cabled memory and the second memory (18A, 18B) being a memory with double port access, the first port (20A, 20B) being a cabled port and the second port (22A, 22B) being a port making it possible to access the second memory (18A, 18B) by wireless communication.

8 Claims, 3 Drawing Sheets

(56) References Cited

OTHER PUBLICATIONS

J Haase et al: "Configuration of smart embedded devices in the field using NFFC", zweiten transdisziplinaren Knoferenz "Technische UnterstOtzugssysteme, die die Menschen wirklich wollen", Dec. 2, 2016 (Dec. 2, 2016), pp. 431-454, XP055446504, ISBN: 978-3-86818-090-9 Extrait de l'Internet: URL:https://www.researchgate.net/profile/Robert Weidner/publication/311669596 Technische Unterstutzungssysteme_die diejlensche n_wiTklichwollen_Band zur zweiten transdisziplinaren_Konferenz_2016/links/ 5853896e08ae0c0f322284e1/Tehntsche_Unterstuetzungs systeme-die-die-Menschen-wirklich-wollen-B and zur-zw [extrait le Jan. 31, 2018] *sections 1.1, 2.1; figure 1.2*.
J Suomalainen et al: "NRC-TR-2007-004 Stnadrds for security associations in personal networks: a comparative analysis", Jan. 9, 2007 (Jan. 9, 2007), XP055262208, Extrait de l'Internet: URL:http://citesserx.ist.psu.edu/viewdoc/download?doi=10.1.1.71.7445&rep=repl&type=pdf [extrait le Apr. 1, 2016] * sections 1 et 2; figure 1 *.
Preliminary Search Report for FR 17 54725, dated Jan. 31, 2018.
Lesjak, et al, "A Secure Hardware Module and System Concept for Local and Remote Industrial Embedded System Identification", 2014, pp. 1-7, IEEE Emerging Technology and Factory Automation (ETFA).

* cited by examiner

ELECTRONIC APPARATUS COMPRISING TWO MEMORIES AND ASSOCIATED APPARATING METHOD

CROSS-REFERENCE TO RELATED APPLICATIONS

This application is a U.S. non-provisional application claiming the benefit of French Application No. 17 54725, filed on May 30, 2017, which is incorporated herein by reference in its entirety.

FIELD OF THE INVENTION

The present invention relates to an electronic device. The present invention also relates to a method for pairing such an electronic device.

The present invention relates to the field of pairing electronic devices, an electronic device being an electrically powered device including electronic components, such as transistors.

The pairing of electronic devices relates to devices intended to interact with at least one other electronic device. This is in particular the case for a device called "FreePlug" by the applicant. A FreePlug is a device using powerline carrier (PLC) technology, making it possible to provide data communication with another FreePlug through the electrical network. This allows a client to benefit from telephone, television or other services in several locations without using Ethernet cables, which makes it easier to install service in certain residences.

FreePlugs serve as a gateway between an Ethernet network and a PLC network. The equipment connected by FreePlugs being of the Ethernet type for the most part, at least one pair of FreePlugs is generally provided, which makes it possible to connect two Ethernet networks through two gateways. Such a pair of FreePlugs is configured to operate correctly through a pairing mechanism. The configuration can be done by the user, but to make the use of FreePlugs more accessible, the configuration is done in the factory.

BACKGROUND OF THE INVENTION

It is known to produce the FreePlugs in series without any particular differentiation, such that the selection of two FreePlugs is done at random, the pairing being done later. To limit the handling traces on the FreePlugs, they are stored in protective packaging.

The pairing is done by sharing a mutual secret between the two FreePlugs. The shared secret will then allow the FreePlugs to communicate later and thus to operate at the client. However, the sharing of the mutual secret involves cabled physical access to the FreePlugs, which assumes breaking the protective packaging of the FreePlugs. The handling of the FreePlugs being delicate, some FreePlugs may be broken at this stage. Furthermore, such handling involves a non-negligible pairing time.

SUMMARY OF THE INVENTION

There is a need for an electronic device, in particular a FreePlug, allowing pairing with another electronic device that is easier to carry out.

To that end, the present description in particular relates to an electronic device intended to interact with at least one other electronic device, the electronic device including a processor, a first memory and a second memory separate from the first memory, the first memory being a cabled memory and the second memory being a memory with double port access, the first port being a cabled port and the second port being a port making it possible to access the second memory by wireless communication.

According to specific embodiments, the electronic device comprises one or more of the following features, considered alone or according to all technically possible combinations:
the second port is able to operate according to a near field communication protocol.
a set of a private key and a public key forms a pair of asymmetrical keys, the first memory storing a private key and the second memory storing a public key.
the electronic device is able to be powered by a power source.
the electronic device is intended to be paired with an electronic device, the two electronic devices preferably being of the same type.
The electronic device is chosen from the group made up of:
an electronic device serving as an interface between the computer and/or audiovisual equipment of the user and an Internet access network,
a device using powerline carrier technology,
a remote control, and
a home automation node.
The present description also relates to a set of electronic devices including at least two electronic devices, each electronic device being intended to interact with at least one other electronic device, the electronic device including a processor, a first memory and a second memory separate from the first memory, the first memory being a cabled memory and the second memory being a memory with double port access, the first port being a cabled port and the second port being a port making it possible to access the second memory by wireless communication.

The present description also describes a pairing method for two electronic devices, each electronic device being intended to interact with at least one other electronic device, the electronic device including a processor, a first memory and a second memory separate from the first memory, the first memory being a cabled memory and the second memory being a memory with double port access, the first port being a cabled port and the second port being a port making it possible to access the second memory by wireless communication, the method including at least the following step:
for each electronic device, generating a pair of asymmetrical keys, the pair of keys including a private key and a public key,
for each electronic device, storing the private key in the first memory and the public key and the identifier of the device in the second memory,
reading the public keys,
generating a secret,
writing the secret encoded by the public key and respective identifiers on each second memory of the electronic device.

The present description also relates to a pairing method for electronic devices, each electronic device being intended to interact with at least one other electronic device, the electronic device including a processor, a first memory and a second memory separate from the first memory, the first memory being a cabled memory and the second memory being a memory with double port access, the first port being a cabled port and the second port being a port making it possible to access the second memory by wireless communication, the method including at least the step of generating a token shared by the two electronic devices, for each electronic device, a step for storing, in the second memory, the token and an identifier specific to the electronic device with which the electronic device is intended to interact, a step for establishing a secure channel between the two electronic devices and a step for sharing a security key between the two electronic devices.

The present description also describes a pairing method for two electronic devices, each electronic device being intended to interact with at least one other electronic device, the electronic device including a processor, a first memory and a second memory separate from the first memory, the first memory being a cabled memory and the second memory being a memory with double port access, the first port being a cabled port and the second port being a port making it possible to access the second memory by wireless communication, the method including at least the step, for each electronic device, of generating a pair of asymmetrical keys, the pair of keys including a private key and a public key, for each electronic device, a step for storing the private key in the first memory, for each electronic device, a step for storing an identifier specific to the electronic device with which the electronic device is intended to interact and two public keys in the second memory, and a step for verifying that the two public keys in each second memory are identical.

BRIEF DESCRIPTION OF THE DRAWINGS

The features and advantages of the invention will appear upon reading the following description of embodiments of the invention, provided as an example only and in reference to the drawings, which are.

DETAILED DESCRIPTION OF THE PREFERRED EMBODIMENTS

Figure 1:
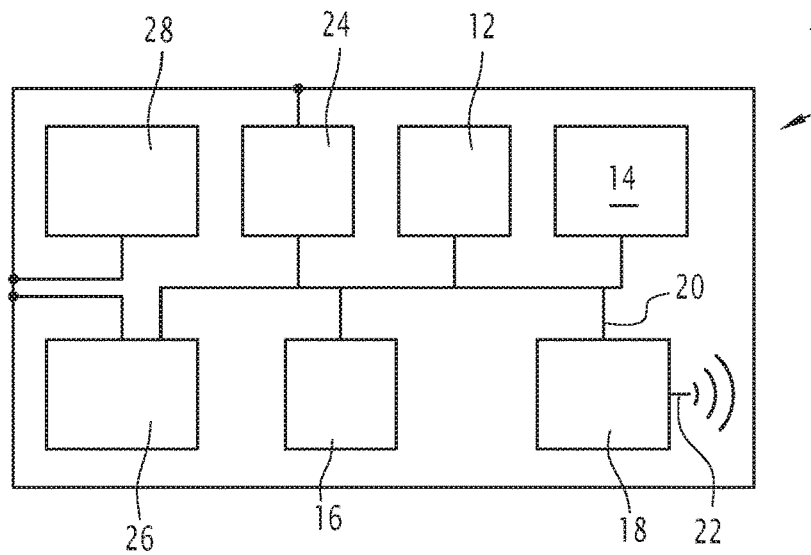
FIG. 1, a schematic illustration of an electronic device.

FIG. 1 shows an electronic device 10.

Hereinafter, it is assumed that the electronic device 10 is a device using the powerline carrier technology.

Several names are used for such an electronic device 10. In particular, the term "case" or the terms "homeplug" or "plug" are found in the literature. In the rest of the description, the term "plug" is used to refer to the electronic device 10.

The plug 10 includes a processor 12, a volatile memory 14 and two nonvolatile memories 16 and 18.

The processor 12 is also referred to using the acronym CPU (central processing unit).

The processor 12 is able to perform operations and interact with the other memories 14, 16 and 18.

The volatile memory 14 is for example a random-access memory (RAM).

Each nonvolatile memory 16 and 18 is able to store data.

The first non-volatile memory 16 is a cabled memory.

Cabled memory refers to a memory that must be powered by a cable to read or write data in said memory. For example, the first nonvolatile memory 16 is an $i^2C$ flash memory.

By definition, the term "$I^2C$" refers to a half-duplex bidirectional synchronous serial bus.

In the rest of the description, the first nonvolatile memory 16 is called cabled memory 16.

The second non-volatile memory 18 is a memory separate from the cabled memory 18.

The second memory 18 is a dual ported access memory

The first port 20 is a cabled port.

Typically, the first port 20 is an $i^2C$ port.

The second port 22 is a port making it possible to access the second memory 18 by wireless communication.

The RFID or Wi-Fi technologies are examples of wireless communication protocols.

According to the described example, the second memory 18 is able to communicate according to a near field communication protocol.

The near field communication (NFC) protocol is a short-range and high-frequency wireless communication technology, making it possible to exchange information between peripherals up to a distance of about 10 cm in general. This technology is an extension of the ISO/CEI 14443 standard, which standardizes proximity cards using radio identification (RFID), which combine a chip card and a reader within a single peripheral.

The second port 22 is therefore an NFC port.

The second port 22 further makes it possible to access the second memory 18 without the plug 10 or the processor 12 being supplied with power. The power supply of the second memory 18 is provided by the magnetic field of the second port 22. In such an example, the near field is used to transport both power and data.

Hereinafter, the second memory 18 is called dual ported memory 18.

In a manner known in itself, the plug 10 includes other elements, such as an Ethernet port 24, an adapter 26 for a PLC network and a power supply unit 28, which are not described in further detail below.

In the described example, the plug 10 is intended to be paired with an electronic device.

In the described case, the electronic device is a device of the same nature, such that the two plugs 10 are paired.

To distinguish the plugs 10 to be paired hereinafter, each plug or each element of a plug is described as first or second, and the corresponding reference signs are followed by a letter.

Thus, hereinafter, the first plug 10A includes the first processor 12A, the first volatile memory 14A, the first cabled memory 16A, the first double ported memory 18A, the first Ethernet port 24A, the first adapter 26A and the first power supply unit 28A, while the second plug 10B includes the second processor 12B, the second volatile memory 14B, the second cabled memory 16B, the second double ported memory 18B, the second Ethernet port 24B, the second adapter 24B and the second power supply unit 28B.

Figure 2:
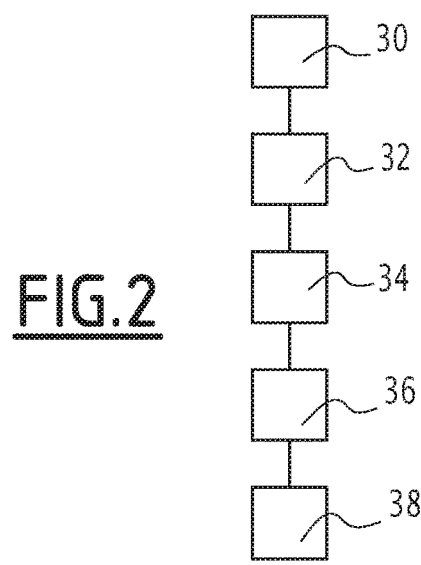
FIG. 2, a flowchart of an example implementation of a pairing method including a first, second and third phase, FIG. 3, a schematic view of one of the two electronic devices during the first phase, FIG. 4, a schematic illustration of two electronic devices during the second phase, and FIG. 5, a schematic view of one of the two electronic devices during the third phase.

The pairing of two plugs 10A and 10B is now described in reference to an example embodiment of a pairing method in reference to the flowchart of FIG. 2.

The pairing method includes a first generating step 30, a storing step 32, a reading step 34, a second generating step 36 and a writing step 38.

The pairing method is carried out in several different locations corresponding to a different phase.

The first phase P1 is the unit manufacturing phase of each plug. The first phase P1 is carried out by the plug manufacturer.

Figure 3:
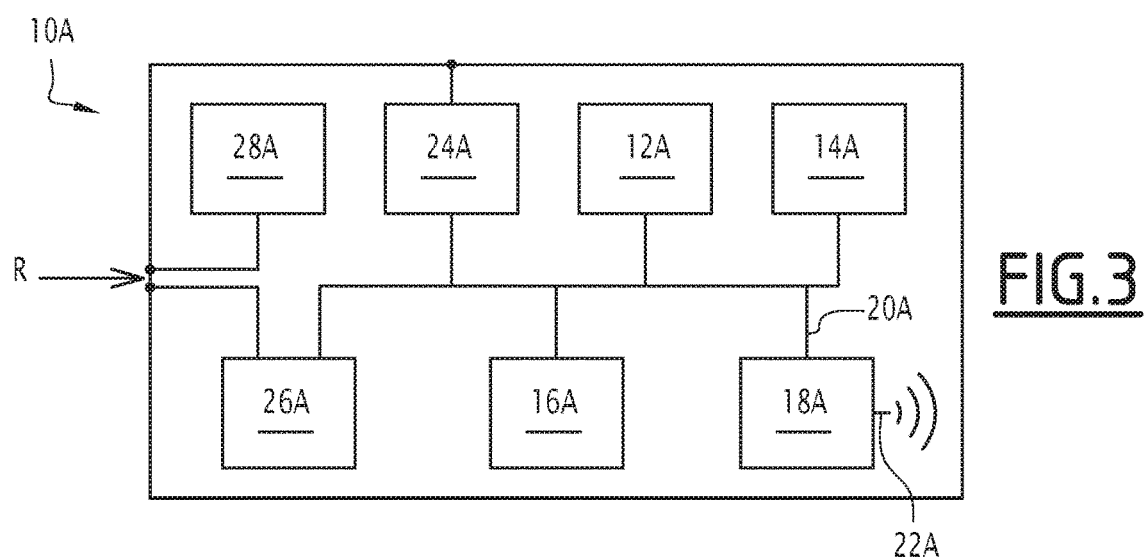

In FIG. 3, the manufacturing of the first plug 10A is illustrated.

The first plug 10A is first powered by the network R.

The first generating step 30 is then carried out.

During the first generating step 30, for the first plug 10A, a first pair of asymmetrical keys is generated including a first private key $K_{privée\ A}$ and a first public key $K_{publique\ A}$.

For example, the first generating step 30 is carried out by implementing an initialization sequence.

The initialization sequence is stored in the first cabled memory 16A and triggered by the first processor 12A.

The storing step 32 is then carried out.

During the storing step 32, the first processor 12A of the first plug 10A then has the first cabled memory 16A store the first private key $K_{privée\ A}$ and has the first double ported memory 18A store the first public key $K_{publique\ A}$ as well as the identifier IdA of the first plug 10A.

The first plug 10A is then packaged in a first packaging 40A.

The first phase P1 is carried out simultaneously for the second plug 10B.

Thus, the second cabled memory 16B stores a second private key $K_{privée\ C}$ and the second double ported memory 18B stores a second public key $K_{publique\ B}$ with the identifier IdB.

The set of the second private key $K_{privée\ B}$ and the second public key $K_{publique\ B}$ forms a second pair of asymmetrical keys.

The first plug 10A is then packaged in a second packaging 40B.

The second association phase P2 is next carried out. The second association phase P2 is carried out in the factory.

Figure 4:
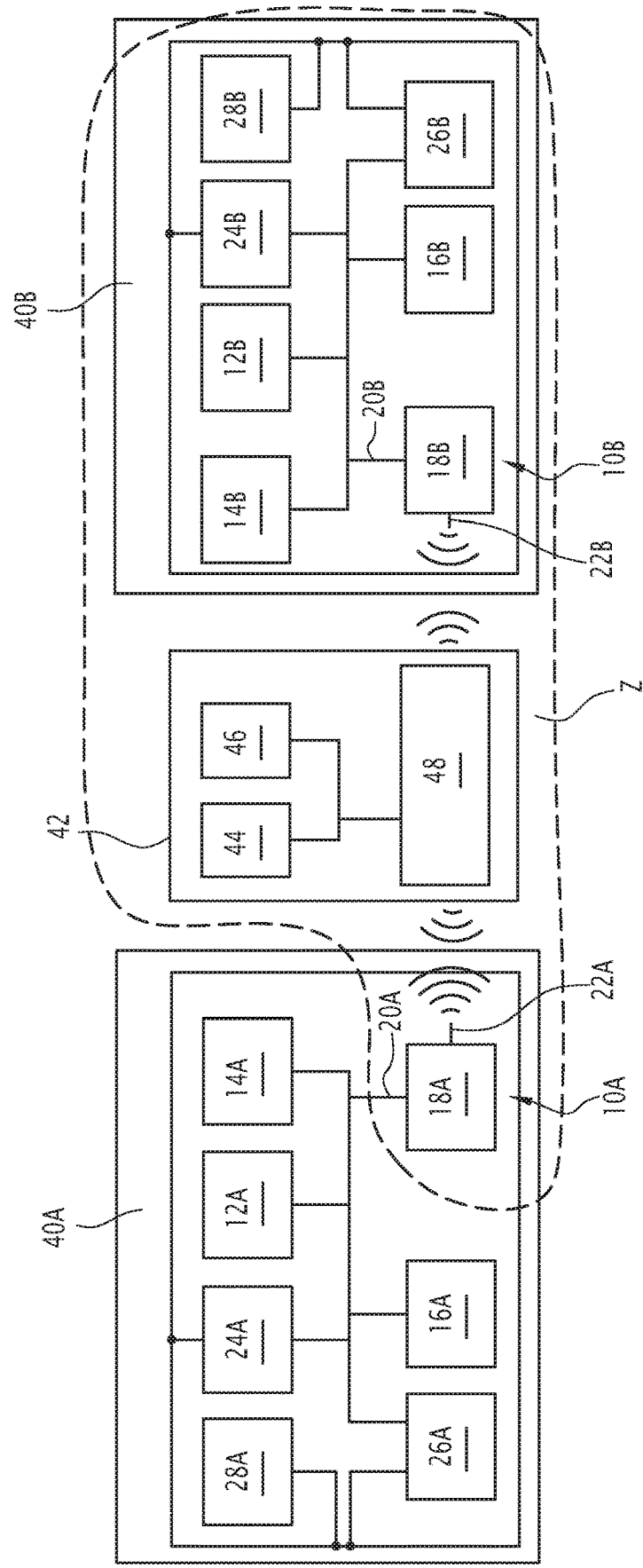

In FIG. 4, an association bench 42 is shown where the packagings 40A and 40B are provided, respectively each including the first plug 10A and the second plug 10B.

This provision is carried out by an arbitrary choice of plugs from among a set of plugs.

During the second phase, it is not possible to access the cabled memory 16A and 16B of each plug 10A, 10B due to the presence of each packaging 40A and 40B without destroying the packaging 40A and 40B in question.

The association bench 42 includes a processor 44, a volatile memory 46 and a PCD 48.

The PCD (Proximity Coupling Device) 48 is capable of powering PICC (Proximity Integrated Circuit Card) devices in a limited zone called action field. The PCD 48 is a device with its own power source, generating the magnetic field, generally "master" from a protocol perspective, while the PICC device is powered "passively" by the PCD device during the communication, generally "slave" from a protocol perspective. The power provided by the PCD device to the PICC device is about 10 mW, which allows the operation of a double ported memory 18A or 18B, but not of a processor 12A or 12B of a plug 10A or 10B. The operation of the double ported memories 18A and 18B is then a passive NFC operation.

The two plugs 10A and 10B are positioned in the action field of the association bench 42 in order to power the first double ported memory 18A and the second double ported memory 18B.

To illustrate that the action field of the association bench 42 may have any form, the action field of the association bench 42 is shown in FIG. 4 in the form of a zone Z delimited by dotted lines that is not symmetrical. In fact, the zone Z includes part of the first plug 10A and the set of elements of the second plug 10B. The only condition to be met for the action field of the association bench 42 is to include at least the first double ported memory 18A and the second double ported memory 18B.

Only the first double ported memory 18A and the second double ported memory 18B are powered, the other memories 14A, 14B, 16A and 16B being memories with cabled access only.

The reading step 34 is then carried out.

During the reading step, the association bench 42 reads the content of the double ported memories 18A and 18B, namely the first public key $K_{publique\ A}$ and the second public key $K_{publique\ B}$, as well as the identifier IdA and IdB of each plug 10A and 10B.

It should be noted that the reading step 34 does not involve removing the packagings 40A and 40B from the first and second plugs 10A and 10B.

Furthermore, the association bench 42 does not have access to the content of the cabled memories 16A and 16B.

The second generating step 36 is next carried out.

During the second generating step 36, the association bench 42 generates a secret S.

The secret S is specific to the pair of the first and second plugs 10A and 10B.

The secret S is therefore a shared secret between the pair of first and second plugs 10A and 10B.

The association bench 42 then encodes the secret S using the public key read during the reading step 34.

More specifically, for the first plug 10A, the association bench 42 uses the first public key $K_{publique\ A}$ to encode the secret S, which makes it possible to obtain a first encoded secret SA.

Similarly, for the second plug 10B, the association bench 42 uses the second public key $K_{publique\ B}$ to encode the secret S, which makes it possible to obtain a second encoded secret SB.

A writing step 40 is next carried out.

During the writing step 40, the association bench 42 writes each encoded secret SA and SB on the double ported memories 18A and 18B. During the writing step, the first identifier IdA is also written on the first double ported memory 18B of the second plug 10B and, in a corresponding manner, the second identifier IdB is written on the double ported memory 18A of the first plug 10A.

At the end of the writing step 40, the first double ported memory 18A and the second double ported memory 18B respectively store the first encoded secret SA and the second encoded secret SB, and the identifiers IdA, IdB of their associated plug 10A, 10B.

The encoded secrets SA and SB coming from the same shared secret S, the two plugs 10A and 10B have a privileged link.

The two plugs 10A and 10B are then placed in a shared packaging, for example a box, then delivered to the user.

Alternatively, to avoid errors, the plugs 10A and 10B are in the same box before even entering the association bench. It is thus guaranteed that the pair of plugs 10A, 10B is indeed packaged in the same box for which the association has been done.

Figure 5:
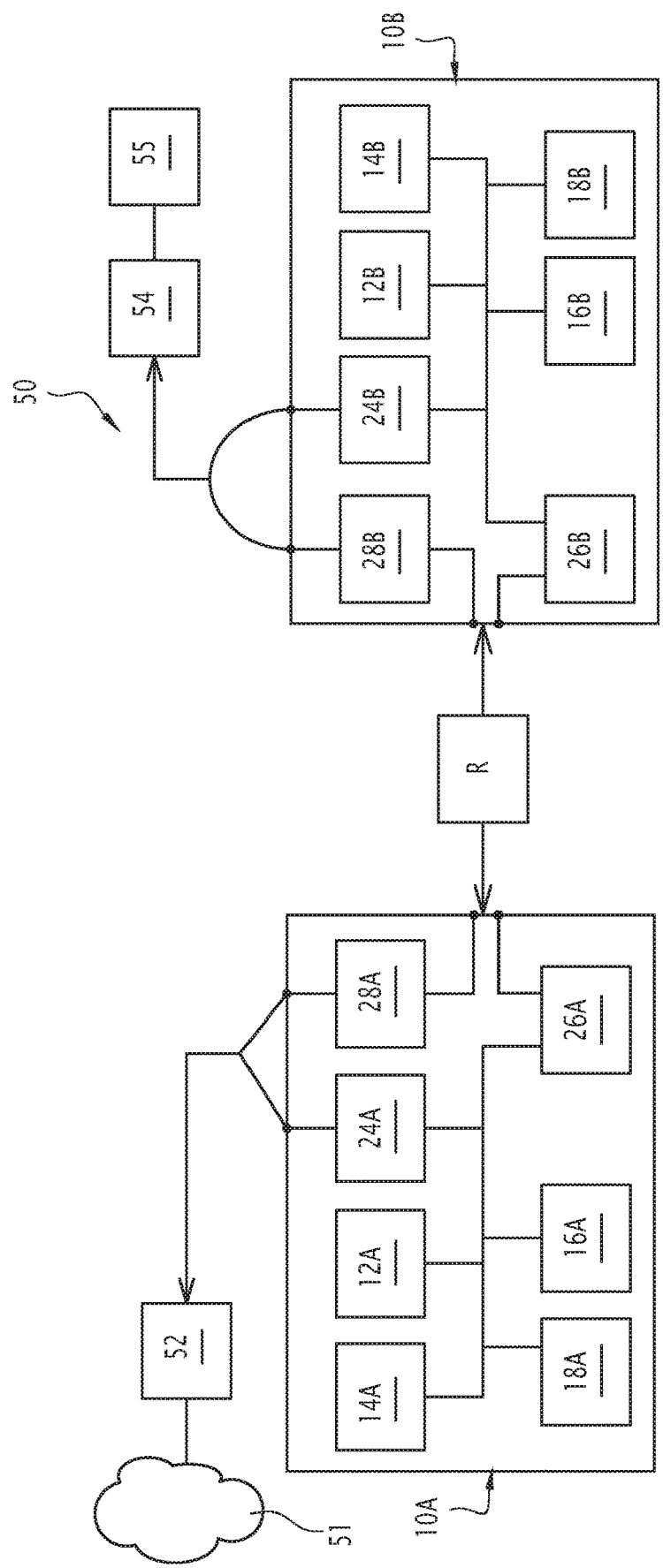

The actual pairing of the two plugs 10A and 10B takes place at the user during the third phase P3, as schematically illustrated in FIG. 5.

In FIG. 5, part of the information installation 50 of the user is shown, the part including two interfaces 52, 54 toward a communication network 51. The communication network 51 is usually a global network, like the Internet.

Each interface 52 and 54 is an electronic device serving as an interface between computer and/or audiovisual equipment 55 of a user and the network.

The interface 52 and 54 is sometimes referred to as "box".

More specifically, the first interface 52 is a first box called gateway, serving as an interface with the communication network 51, while the second interface 54 is a second box called STB, serving as interface with a piece of audiovisual equipment 55.

Each plug 10A and 10B is connected on the one hand to the electrical network R of the house and on the other hand to an interface 52 and 54.

In the described example, the first plug 10A is connected to the first interface 52 and the second plug 10B is connected to the second interface 54.

Once powered by the network R, each plug 10A and 10B reads the cabled memory 16A and 16B to obtain the private key $K_{privée\ A}$ and $K_{privée\ B}$.

Each plug 10A and 10B also reads the double ported memory 18A and 18B via the cabled port 20A and 20B to obtain the encoded secret SA and SB, as well as the identifiers IdB and IdA.

Each plug 10A and 10B uses the private key $K_{privée\ A}$ and $K_{privée\ B}$ to decode the encoded secret SA and SB and deduce the shared secret S therefrom.

The plugs 10A and 10B next use the shared secret S to initiate a data exchange session through the network R, the first plug 10A seeking the device identified by the second identifier IdB on the network R, and the second plug 10B seeking the device identified by the first identifier IdA on the network.

The plugs 10A and 10B are then paired. The two plugs 10A and 10B then form a set of electronic devices 10A and 10B.

The pairing method is simple for the user, since it suffices to power the plugs 10A and 10B for the pairing to take place between the two plugs 10A and 10B.

For the manufacturer of the plugs 10A and 10B, the implementation of the pairing method makes it possible to operate even with packaged plugs 10A and 10B and without a physical connection.

The possibility of carrying out the pairing method even with the plugs 10A and 10B packaged makes it possible on the one hand to protect the plugs 10A and 10B at all times, while on the other hand being able to pair the plugs at the last minute.

It should be noted that the method is also applicable to re-pair plugs 10A and 10B that have already been paired; for example, if a user returns the plugs 10A and 10B, they can be paired again for another user.

In particular, it should be noted that the pairs of plugs 10 can be broken to create new pairs of plugs. This possibility is particularly interesting if one of the plugs 10 of the old pair is no longer in working condition.

Furthermore, the security of the plugs 10A and 10B is provided by the fact that the shared secret S is only accessible by having access to the cabled memory 16A and 16B, which a third party can only obtain by destroying the cardboard and plastic packaging.

Furthermore, the method is applicable to any type of electronic device 10 intended to interact with at least one other electronic device 10, as long as the electronic device 10 includes a processor 12, a cabled memory 16 and a double ported memory 18, the cabled memory 16 being separate from the double ported memory 18.

According to another example, the electronic device 10 is an electronic device used as an interface between the computer and/or audiovisual equipment of a user and an Internet access network, i.e., the electronic device is an interface 52 or 54.

Alternatively, the electronic device 10 is a remote control.

According to another alternative, the electronic device 10 is a home automation node. A radio sensor, a controlled socket or a radio switch are specific examples of home automation nodes.

Furthermore, it should be noted that the method works for any type of encryption with asymmetrical keys, which makes it possible to adapt the security of the method based on the desired application. A more evolved encryption is chosen if one wishes to further increase the security of the pairing method.

Other embodiments of the pairing method can also be considered.

According to one particular embodiment, it is thus possible to consider performing the pairing without writing by the association bench 42 of each encoded secret SA and SB in the appropriate memories.

Instead, the association bench 42 writes the same token in the double ported memories 18A and 18B. The token is a long enough message to have a negligible likelihood of collision. Typically, a 256 bit message fulfills the above condition.

Furthermore, for each plug 10A and 10B, the association bench 42 writes the identifier IdA, IdB of the plug 10A and 10B to be paired with the considered plug 10A and 10B in the double ported memory 18A and 18B of the considered plug 10A and 10B.

The pairing between the two plugs 10A and 10B is then done by building a secure channel between the two plugs 10A and 10B. The building is for example done cryptographically, by using a Diffie-Hellman algorithm, which makes it possible to generate temporary keys.

To validate that no third party has interposed itself, the shared token injected by the association bench makes it possible to validate each of the temporary keys of the Diffie-Hellman algorithm. Typically, the token is used jointly with the key resulting from the Diffie-Hellman algorithm in a signature, which is only validated by the plug 10A and 10B to be paired if the communication is not subject to an attack of the MITM (man in the middle) type. After this verification, the channel is considered secure.

When the channel is considered secure, the two plugs 10A and 10B exchange a shared key.

The shared key is kept over the long term.

At the expense of vulnerability to an attack of the MITM type, such an embodiment makes it possible to avoid creating a pair of asymmetrical keys per plug 10A and 10B.

According to another particular embodiment, it is thus possible to consider performing the pairing without writing by the association bench 42 of each encoded secret S1 and S2 in the appropriate memories.

Instead, the association bench 42 also writes, in each double ported memory 18A and 18B, the public key of the plug 10A and 10B to be paired as well as the identifier of the plug 10A and 10B to be paired. To that end, the association bench 42 can read the public key of the plug 10A and 10B to be paired.

During pairing at the user, a secure key exchange is carried out between the two plugs 10A and 10B while checking the match between the public keys on each of the double ported memories. The RSA algorithm makes it possible to establish such a verification.

During these different embodiments, the association bench systematically provides each plug 10A and 10B with the identifiers IdA and IdB of its pair 10A and 10B.

All of the embodiments described above can be combined when technically possible to obtain other embodiments.

The invention claimed is:

1. A set of electronic devices comprising at least two electronic devices, each electronic device being paired with at least one other electronic device, the at least two electronic devices being of the same type, a first electronic device in the set of electronic devices comprising a processor, a first memory and a second memory separate from the first memory, the first memory being a cabled memory and the second memory being a memory with access to a first and second port, the first port being a cabled port and the second port being a wireless communication port that provides access to the second memory by wireless communication,
   wherein the set of electronic devices uses powerline carrier technology; and
   wherein the set of electronic devices further comprises an association bench configured to:
      read public keys stored in the corresponding second memory;
      generate a secret that is encoded by the respective public keys, the secret being a shared secret between said at least two electronic devices, and
      write the secret encoded by the respective public key on the second memory of the respective electronic device.

2. The set of electronic devices according to claim 1, wherein the second port is able to operate according to a near field communication protocol.

3. The set of electronic devices according to claim 1, wherein a set of a private key and a public key forms a pair of asymmetrical keys, the first memory storing a private key and the second memory storing a public key.

4. The set of electronic devices according to claim 1, wherein the set of electronic devices is able to be powered by a power source.

5. A method of pairing electronic devices in a set of electronic devices comprising at least two electronic devices, each electronic device in the set of electronic devices being paired with at least one other electronic device, the paired electronic devices being of the same type, each electronic device in the paired electronic devices comprising a processor, a first memory and a second memory separate from the first memory, the first memory being a cabled memory and the second memory being a memory with double port access, the first port being a cabled port and the second port being a wireless communication port making it possible to access the second memory by wireless communication, the method comprising:
   for each electronic device of the paired electronic devices, generating a pair of asymmetrical keys, the pair of keys including a private key and a public key,
   for each electronic device of the paired electronic devises, storing the private key in the first memory and the public key and the identifier of the device in the second memory,
   reading the public keys,
   generating a secret that is encoded by the respective public keys, the secret being a shared secret between said at least two electronic devices, and
   writing the secret encoded by the public key and respective identifiers on each second memory of each electronic device of the paired electronic devices;
   wherein the set of electronic devices uses powerline carrier technology.

6. A method of pairing electronic devices in a set of electronic devices comprising at least two electronic devices, each electronic device in the set of electronic devices being paired with at least one other electronic device, the paired electronic devices being of the same type, each electronic device of the paired electronic devices comprising a processor, a first memory and a second memory separate from the first memory, the first memory being a cabled memory and the second memory being a memory with double port access, the first port being a cabled port and the second port being a wireless communication port making it possible to access the second memory by wireless communication, the method comprising:
   generating a token shared by each of the paired electronic devices,
   for each electronic device of the paired electronic devices, storing, in the second memory, the token and an identifier specific to the electronic device with which the electronic device is intended to interact,
   establishing a secure channel between the paired electronic devices, and
   sharing a security key between the paired electronic devices;
   wherein the method further comprises for each electronic device of the paired electronic devices, generating a pair of asymmetrical keys, the pair of keys including a private key and a public key,
   for each electronic device of the paired electronic devices, storing the private key in the first memory and the public key and the identifier of the device in the second memory,
   reading the public keys,
   generating a secret that is encoded by the respective public keys, the secret being a shared secret between said at least two electronic devices, and
   writing the secret encoded by the public key and respective identifiers on each second memory of each electronic device of the paired electronic devices;
   wherein the set of electronic devices uses powerline carrier technology.

7. A method of pairing electronic devices in the set of electronic devices according to claim 1, the method comprising:
   for each electronic device in the set of electronic devices, generating a pair of asymmetrical keys, the pair of keys including a private key and a public key,
   for each electronic device in the set of electronic devices, storing the private key in the first memory,
   for each electronic device in the set of electronic devices, storing an identifier specific to the electronic device with which the electronic device is intended to interact and two public keys in the second memory, and
   verifying that the two public keys in each second memory are identical.

8. The set of electronic devices according to claim 1, wherein at least one electronic device is a homeplug.

* * * * *